(12) United States Patent
Lawrence et al.

(10) Patent No.: US 8,947,401 B2
(45) Date of Patent: Feb. 3, 2015

(54) DISPLAY DEVICE

(75) Inventors: Nicholas A. Lawrence, Cambridge (GB); Raul Benet Ballester, Cambridge (GB); Adrian J. Cable, Cambridge (GB); James E. G. Wright, Cambridge (GB)

(73) Assignee: Light Blue Optics Ltd, Cambridge (GB)

( * ) Notice: Subject to any disclaimer, the term of this patent is extended or adjusted under 35 U.S.C. 154(b) by 627 days.

(21) Appl. No.: 13/130,741

(22) PCT Filed: Dec. 23, 2009

(86) PCT No.: PCT/GB2009/051768
§ 371 (c)(1),
(2), (4) Date: Jul. 1, 2011

(87) PCT Pub. No.: WO2010/073045
PCT Pub. Date: Jul. 1, 2010

(65) Prior Publication Data
US 2011/0254811 A1    Oct. 20, 2011

(30) Foreign Application Priority Data

Dec. 24, 2008 (GB) .................................. 0823457.7
May 29, 2009 (GB) .................................. 0909311.3
May 29, 2009 (GB) .................................. 0909315.4

(51) Int. Cl.
*G06F 3/042* (2006.01)
*G03H 1/22* (2006.01)
(Continued)

(52) U.S. Cl.
CPC ................ *G06F 3/042* (2013.01); *G03H 1/005* (2013.01); *G03H 1/2205* (2013.01); *G03H 1/2294* (2013.01); *G06F 1/3231* (2013.01); *G06F 3/0425* (2013.01); *G06F 3/0426* (2013.01); *G06Q 50/12* (2013.01); *G03H 2001/0061* (2013.01); *G03H 2001/2215* (2013.01); *G03H 2001/2221* (2013.01);
(Continued)

(58) Field of Classification Search
None
See application file for complete search history.

(56) References Cited

U.S. PATENT DOCUMENTS 5,498,867 A    3/1996   Senuma et al.
6,323,942 B1   11/2001  Bamji
(Continued)

FOREIGN PATENT DOCUMENTS

WO    WO 02/101443       12/2002
WO    WO 2005/059660     6/2005
(Continued)

*Primary Examiner* — Joseph Feild
*Assistant Examiner* — Parul Gupta
(74) *Attorney, Agent, or Firm* — Hamilton DeSanctis & Cha

(57) ABSTRACT

We describe a touch sensitive image display device for projecting a touch sensitive displayed image at an acute angle onto a surface on which the device is placed, the device comprising: a first light source to project a first light distribution; a second light source to project a second light distribution; a touch sensor system to remotely detect touch of an area of said surface within or adjacent to said displayed image by detecting change of said first light distribution, and having an output to provide a detected touch signal; a presence sensor system to remotely detect presence of an object at least partially within said second light distribution by detecting change of said second light distribution, and having an output to provide a detected presence signal; a controller configured to control said device responsive to said detected touch signal and further configured to control said device responsive to said detected presence signal.

18 Claims, 10 Drawing Sheets

(51) Int. Cl.
  *G06F 1/32*     (2006.01)
  *G06Q 50/12*    (2012.01)
  *G03H 1/00*     (2006.01)

(52) U.S. Cl.
  CPC ... *G03H 2001/2271* (2013.01); *G03H 2210/22* (2013.01); *Y02B 60/1289* (2013.01); *G03H 2210/441* (2013.01); *G03H 2001/2213* (2013.01)
  USPC .......................................................... 345/175

(56) References Cited

U.S. PATENT DOCUMENTS

| | | |
|---|---|---|
| 6,367,933 B1 | 4/2002 | Chen et al. |
| 6,491,400 B1 | 12/2002 | Chen et al. |
| 6,650,318 B1 | 11/2003 | Arnon |
| 7,379,619 B2 | 5/2008 | Ikeda et al. |
| 7,453,419 B2 * | 11/2008 | Yee et al. .................. 345/39 |
| 7,907,646 B2 | 3/2011 | Mizuuchi et al. |
| 8,022,941 B2 * | 9/2011 | Smoot .......................... 345/175 |
| 8,588,862 B2 * | 11/2013 | Schlomann et al. .......... 455/567 |
| 2002/0021287 A1 | 2/2002 | Tomasi et al. |
| 2006/0187199 A1 | 8/2006 | Lieberman |
| 2006/0244720 A1 | 11/2006 | Tracy |
| 2007/0222760 A1 * | 9/2007 | Lieberman et al. ......... 345/168 |
| 2007/0263999 A1 * | 11/2007 | Keam ........................... 396/155 |
| 2010/0142016 A1 | 6/2010 | Cable et al. |

FOREIGN PATENT DOCUMENTS

| | | |
|---|---|---|
| WO | WO 2006/108443 | 10/2006 |
| WO | WO 2006/134398 | 12/2006 |
| WO | WO 2007/031797 | 3/2007 |
| WO | WO 2007/110668 | 10/2007 |
| WO | WO 2007/141567 | 12/2007 |
| WO | WO 2008/038275 | 4/2008 |
| WO | WO 2008/146098 | 12/2008 |
| WO | WO 2010/073047 | 7/2010 |

* cited by examiner

DISPLAY DEVICE

CROSS REFERENCE TO RELATED APPLICATION

This application claims priority to PCT Application No. PCT/GB2009/051768 entitled "Display Devices" and filed Dec. 23, 2009, which itself claims priority to Great Britain Patent Application No. GB0823457.7 filed Dec. 24, 2008, claims priority to Great Britain Patent Application No. GB0909311.3 filed May 29, 2009, claims priority to Great Britain Patent Application No. GB0909315.4 filed May 29, 2009. The entirety of each of the aforementioned applications is incorporated herein by reference for all purposes.

BACKGROUND OF THE INVENTION

This invention generally relates to a touch sensitive display device, a consumer electronic device comprising such a device, and to a consumer electronic device having a touch sensitive user interface.

We have previously described techniques for displaying an image holographically—see, for example, WO 2005/059660 (Noise Suppression Using One Step Phase Retrieval), WO 2006/134398 (Hardware for OSPR), WO 2007/031797 (Adaptive Noise Cancellation Techniques), WO 2007/110668 (Lens Encoding), and WO 2007/141567 (Colour Image Display), and GB application GB0823457.7 filed on Dec. 24, 2008 (Holographic Image Display Systems). These are all hereby incorporated by reference in their entirety.

Projecting downwards and outwards onto a flat surface such as a tabletop entails projecting at an acute angle onto the display surface (taking this as the angle between the centre of the output of the projection optics and the middle of the displayed image—this angle, to a line in the surface, is less that 90°). We conveniently refer to this as "table down projection". Table down projection is not readily achievable by conventional image display techniques; scanning image display systems have a narrow throw angle and thus find it difficult to achieve a useful image size whilst projection systems, especially those based on LEDs (light emitting diodes) which have a wide light output angle, find it difficult to achieve a useful depth of field. Moreover table down projection can often involve very substantial distortion of an image which can result in inefficient use of the area of an image display device, resulting in major reductions in image brightness and overall system efficiency. Background information relating to compensating for keystone distortion in an LCD projector can be found in U.S. Pat. No. 6,367,933 (WO00/21282); further background prior art can be found in: WO02/101443; U.S. Pat. Nos. 6,491,400; 7,379,619.

Holographic image display techniques are described in our UK Patent Application number GB0822336.4 filed on 8 Dec. 2008 hereby incorporated by reference in its entirety. Background prior art relating to touchsensing can be found, for example, in patent applications filed by Lumio Inc (such as WO2008/038275) and VKB Inc (such as US2007/222760), as well as in patent/applications filed by Canesta Inc (for example U.S. Pat. No. 6,323,942), and patent applications filed by Sensitive Object (such as WO2006/108443 and WO2008/146098).

BRIEF DESCRIPTION OF THE DRAWINGS

This invention generally relates to a touch sensitive display device, a consumer electronic device comprising such a device, and to a consumer electronic device having a touch sensitive user interface.

For a better understanding of the invention and to show how the same may be carried into effect, reference will now be made, by way of example, to the accompanying drawings, in which:

FIG. 3b shows a more detailed block diagram of an embodiment having features discussed in relation to FIGS. 1 to 2 and 3a;

BRIEF SUMMARY OF THE INVENTION

Figure 1:
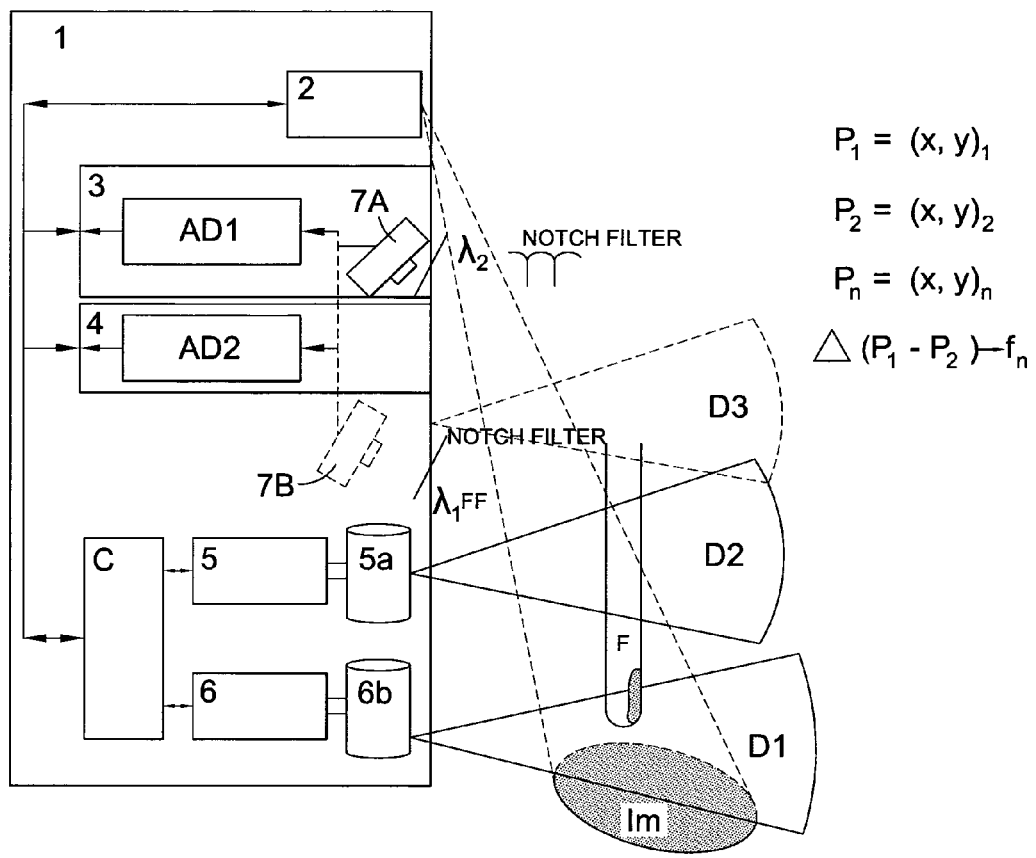
FIG. 1 shows a display device of an embodiment.

This invention generally relates to a touch sensitive display device, a consumer electronic device comprising such a device, and to a consumer electronic device having a touch sensitive user interface.

The inventors have further recognized that "tabledown" projectors of the type we have previously described can be combined with touch sensing technology to provide a touch sensitive image display with many advantages, including where the image display technique is non-holographic or holographic.

Power Management and Interaction

According to a first aspect of the present invention, there is provided a touch sensitive image display device for projecting a touch sensitive displayed image at an acute angle onto a surface on which the device is placed, the device comprising: a first light source to project a first light distribution; a second light source to project a second light distribution; a touch sensor system to remotely detect touch of an area of said surface within or adjacent to said displayed image by detecting change of said first light distribution, and having an output to provide a detected touch signal; a presence sensor system to remotely detect presence of an object at least partially within said second light distribution by detecting change of said second light distribution, and having an output to provide a detected presence signal; a controller configured to control said device responsive to said detected touch signal and further configured to control said device responsive to said detected presence signal.

Advantages of such a device may comprise power management, for example by reducing power to an element (e.g. the first light source) as part of a said responsive control. Additionally or alternatively, an advantage may be enhancing interaction with the device. For example, a sub-image such as a menu or button (e.g. fast forward, fast rewind, pause, etc) may be displayed as part of a said responsive control. In any one of the embodiments described herein, any controllable element of the device may be switched on/off or any action stopped/initiated in response to either or both of the signals.

For projecting the touch sensitive displayed image, the device may further comprise an image projection element(s) such as an image projector. There may further be provided a device data input to receive data defining the image to be displayed.

Such a projector will be associated advantageously with projection optics, or the projector itself arranged to project at the acute angle, an acute angle being definable as less than 90° to the surface on which the image is being displayed.

Further regarding the above projector, it may be advantageous to use an SLM (Spatial Light Modulator), which may for example be a liquid crystal device pixellated device such as a LCOS (liquid crystal on silicon) device and may be a transmissive or reflective device, to provide a dynamic display. A dynamic display may allow the displayed image to be updated (e.g., scrolled, panned, zoomed) in response to the detection of a touch/presence (or movement thereof) of the displayed image. An SLM may be provided in the form of a pixellated element, wherein each pixel is driveable to reflect or transmit receives light according to an input signal depending on a corresponding portion of image data. Thus, there may be provided further the above touch sensitive image display device further comprising an SLM, image projection optics comprising at least one light source to illuminate the SLM, and output optics to protect modulated light from the SLM on to the surface at the acute angle. The device may then be configured to dynamically determine the modulation of the SLM on the basis of the input image. The light source for the projector including the SLM may comprise a coherent light source, a light emitting diode, a filament lamp and/or fluorescent lamp.

In particular, the projector may be a holographic projector. For example, the above image projection optics may be holographic image projection optics, the light source to illuminate the SLM may comprise a coherent light source and the modulated light may then be coherent light, and, moreover, the touch sensitive image display device may then be configured to holographically project a touch sensitive displayed image at the acute angle. The control of the SLM may then result in a hologram being displayed on the SLM pixels. Such a hologram may be calculated on the basis of the input image and further compensated to substantially cancel any distortion in the displayed image that would otherwise occur due to the acute angle. Advantages of holographic projection may include a greater depth of focus, a wide throw angle, long depth of field, and/or very substantial distortion correction without substantial loss of brightness/efficiency, compared to a non-holographic system.

Regarding the first and second light distributions, it is noted that there may be any number of further second light distributions, which is/are associated with the above presence sensor system or corresponding further presence system(s) to remotely detect presence in the/each further distribution. Then the controller may be responsive to detected presence signals of a plurality of second light distributions (taking the further distributions to be additional second distributions), which may be projected, for example, at different levels above the first light distribution ('above' assumes the displayed image and surface are 'below'). Any one of the first and second light sources may be an infra-red light source. In this case, each sensor of the touch and presence sensor systems may have a filter to pass infra-red and not visible light. Moreover, a filter, e.g., notch filter, may be used to discriminate between different wavelengths used for each light source, so that the first and second light sources (and any further light sources) may more conveniently be used simultaneously.

The touch sensor system may comprise one or more separate touch sensors. This may be advantageous for detecting location of a touch or for detecting one or more simultaneous touches, especially if the sensors are far enough apart to reduce instances of one touch being hidden behind another. A distributed arrangement of touch sensors may thus be provided. Thus, there may be provided the touch sensor system comprising a plurality of touch sensors each to remotely detect touch of the displayed image within or adjacent to the displayed image, and having an output to provide a detected touch signal.

(For further clarity, it is noted that references to touching the displayed image throughout this specification may mean touching the surface in an area where the displayed image is displayed, or where in some embodiments a further image, e.g., a sub-image within the displayed or a screen saver replacing the displayed image temporarily, is touched).

The detection of change in the first or second light distribution may be achieved by detecting light redirected due to scattering, refraction or diffraction by an object placed in the light distribution. For the presence sensor system, it may however be advantageous to detect a reduction in power received from the second distribution due to absorption or blocking of light by an object. The object may be, for example, a user's finger, a stylus, etc. Furthermore, the presence detection may be motion-sensitive, e.g. to detect when the user's hand is moving towards the first distribution or the displayed image. Alternatively, the presence detection may merely detection presence, e.g., to detect that a user's hand is still present even when the user pauses.

As with the touch sensor system, the presence sensor system may comprise one or more presence sensors, particularly advantageously for detecting one or more simultaneous presences especially where one presence may hidden behind another.

Particularly advantageously, the touch sensitive image display device may be used to detect hovering of an object by detecting absence of a touch detection while presence is detected.

There may further be provided the above touch sensitive image display device, wherein said responsive control comprises changing power of illumination of projecting at an acute angle onto said surface a further image adjacent to or at least partially overlapping said displayed image. In this case, the power changing is preferably increasing the power, e.g., initiating projection of the further image, however the change may be decreasing. (In this regard, any reference to "power" in the specification may be a reference to average power, e.g., if the power is amplitude modulated (e.g. repetitively pulsed on/off), this particularly applying to the first and second light sources) the changing power of projecting the further image may in particular activate display of a sub-image that replaces, or is overlaid on (similarly to a water mark), a portion of the displayed image. Furthermore, the change may include starting projecting of an image that replaces the entire displayed image. For example, if the further image fully overlaps the displayed image, the further image could be a low-power screen saver, the further image being adapted to reduce the required projection power relative to a higher complexity image. Where the further image is a sub-image, this may be a menu or a control button such as stop, fast forward, rewind, start, pause etc.

There may further be provided the above touch sensitive image display device, wherein said responsive control to change said power is responsive to said detected presence signal. The change is preferably an increase in power, but may alternatively be a decrease. The change responsive to the detected presence signal may occur when the presence signal indicates that an object is present or as being present within a preceding predetermined time period in the second distribution. Similarly, the responsive control may occur when the touch signal indicates that the displayed image is touched or has been touched within a preceding predetermined period.

There may be further provided the above touch sensitive image display device, further comprising a timer to time absence of a said touch on the basis of said touch signal, and wherein said responsive control further comprises changing, e.g., reducing, said power of illumination of said further image when said timer reaches a threshold. Thus, the timer may time a period during which no touch is detected. The reaching of a threshold may correspond to the timer having timed a predetermined period.

There may be further provided in an embodiment a device the above touch sensitive image display device, further comprising a timer to time absence of a said presence on the basis of said presence signal, and wherein said responsive control further comprises changing, e.g., reducing, said power of illumination of said further image when said timer reaches a threshold. The above comments concerning a timer apply similarly to the time of such an embodiment.

There may be further provided the above touch sensitive image display device, configured to provide a lower maximum and/or average emission power from said second light source than from said first light source. For example, the second light source may be a low power light source relative to the first light source and may even be of different technology, e.g., LED, lamp or laser, preferably infra-red. In such an embodiment, where the responsive control is to switch off the first light source, power consumption may advantageously be reduced.

There may further be provided the above touch sensitive image display device, wherein said responsive control comprises changing, e.g., increasing, power emitted by said first light source when said presence signal indicates a said presence. For example, such increasing may mean turning the first light source back on. More generally, any element of the touch sensing system including the touch sensor system and first light source may be (re)activated when the present signal indicates a presence.

There may further be provided the above touch sensitive image display device, further comprising a timer to time absence of a said touch on the basis of said touch signal, and wherein said responsive control further comprises changing, e.g., reducing, power emission from said first light source when said timer reaches a threshold. However, in an embodiment wherein a touch cannot occur without a corresponding presence (for example, if a user's finger must pass through the second distribution to reach the first distribution), the timing may instead be done on the basis of the presence signal. A said reduced power may mean that the first distribution light source is switched off. "Power" may mean the average power of the first light source when that light source is operated such that a touch detection can occur; this is particularly relevant if the first light source emissions variable, e.g., repetitively pulsed. (Pulsing of one or more of the distributions as mentioned throughout this specification may enable rejection of at least some of the ambient light in a corresponding sensor system detection, particularly where a PLL is used as further described herein. Where pulsing is used, the background/ambient signal level may be read as frequently, preferably twice as frequently, as the pulsing of the corresponding light source).

There may be further provided the above touch sensitive image display device, wherein said touch sensor system is further to remotely detect location of a said detected touch. Additionally or alternatively, the presence sensor may detect location of a said presence. Any such location detection may be achieved by using a multi-pixel sensor such as a digital camera or CCD array.

There may further be provided the above touch sensitive image display device, configured to determine said threshold on the basis of a said location of a said touch. Thus, how long the first light source retains a non-reduced power may depend on the location of the touch, particularly advantageously depending on a previous touch (e.g., the immediately preceding, i.e., last, touch) and a particular region (e.g., displayed menu option, button, icon, etc.) of the displayed image so touched. This may require mapping from the detected location to a portion of the input image to account for distortion due to the acute angle.

There may be further provided the above touch sensitive image display device, wherein said responsive control comprises reducing power emitted by said second light source when said detected touch signal indicates a said touch detection reducing may mean that the second distribution light source is switched off.

There may be further provided the above touch sensitive image display device, configured to repetitively vary power of a said light distribution. If the pulsing is repetitive or periodic, light power emitted by the first light source may be determined by a duty cycle of the pulsing if the first light source emission remains substantially constant and the distribution power is amplitude modulated, e.g., pulsed on/off, this can in embodiments help to reduce the signal-noise ratio of detection by allowing background noise to be cancelled out. In this case, a phase locked loop (PLL) may be used to detect synchronously with the pulsing, and/or measurements of the background radiation power may be made when the light source is off.

There may further be provided the above touch sensitive image display device, wherein said second light source is said first light source thus, the first and second light distributions may be projected alternately from the same (shared) light source or different wavelengths light may be filtered from a broadband light source typified each distribution.

There may further be provided the above touch sensitive image display device, further comprising a spatial light modulator (SLM) and a controller to control said SLM, on the basis of data defining said displayed image, to replay a target image distorted to compensate for projection onto said surface at said acute angle. The controller may process input date defining the (preferably undistorted) image to be displayed to generate data suitable for modulation of the SLM to protect the image such that the image as projected on the surface appears substantially undistorted. Replay of the target image may mean driving a pixellated SLM according to target image data.

There may further be provided the above touch sensitive image display device wherein the first light distribution and/or the second light distribution is substantially two-dimensional. Thus, such a distribution may be a sheet of light. Thus here and in the description below the or each substantially two-dimensional first distribution in embodiments defines a substantially laminar distribution, for example having a divergence in a vertical plane of less than 10°, 5° or 2°.

The distribution may be substantially parallel to the surface. Particularly advantageously, the first distribution is located at less than about 3 mm from the surface, or at least such that the user feels that the device is responsive to his touching of the image itself when the touch sensor is activated by a touch detection. However, the second (or any further) light distribution in particular may alternatively be a 3-dimensional volume such as a cone.

There may further be provided the above touch sensitive image display device, wherein said first light distribution extends over a first area of said surface, said second light distribution extends over a second area of said surface, and said second area at least partially overlaps said first area. In this case, overlapping may mean extending beyond the first area. Such an embodiment is advantageously able to detect approach, e.g., an object being near or coming towards the displayed image, depending on whether the presence sensor system comprises a motion detector or not. The second area may be greater than the first area so that, for example, the second area encompasses the first area, which in turn preferably encompasses the displayed image.

There may further be provided the above touch sensitive image display device configured to determine that an object detected by said device is present at least partially within said second light distribution is laterally beyond said displayed image.

Broadly, lateral may mean in a direction parallel to the plane of the displayed image on the surface. It is further noted that the presence sensor system may detect presence only in portions of the second light distribution that do not overlap with the first light distribution in the sense described above. Detection in an area overlapping the first distribution may not be needed for detecting proximity or approach towards the first distribution for a straight displayed image.

Further in this regard, there may be provided the above touch sensitive image display device, wherein said presence sensor system is to detect movement of said laterally beyond object towards said displayed image.

As mentioned above, there may be provided the above touch sensitive image display device, wherein said touch sensor system is to detect said remote touch by detecting light scattered by said object from said first light distribution. Similarly, the presence sensor system may be to detect said remote presence by detecting light scattered by said object from said second light distribution.

Further as mentioned above, there may be provided the above touch sensitive image display device, wherein at least one of said sensor systems comprises a multi-pixel sensor the at least one sensor system may be the touch sensor system or the presence sensor system. The multi-pixel sensor may be, for example, a CCD array or a digital camera to allow detection of location of presence, or may be a single-pixel sensor such as a photodiode, phototransistor or charge-coupled device, i.e., having a single light sensor so that the sensors indicates light detection, e.g., by provided a single binary output or an analogue representation of received light intensity. (Any one of the sensors described herein may indicate light intensity and/or location, wherein any such indication of intensity may be binary, M-ary (where M>2) or analogue).

There may further be provided the above touch sensitive image display device, wherein said touch sensor system is said presence sensor system. This is of particular advantage for where both sensor systems comprise a multi-pixel sensor and detection from the sensor in relation to each light distribution can be multiplexed in time. Further in this regard, the touch sensor system may comprise at least one pixel of the shared multi-pixel sensor while the presence sensor system comprises at least one other pixel of the multi-pixel sensor. For example, the touch sensor system may use a group of pixels essential to the multi-pixel sensor while the presence sensor system uses pixels on the boundary of the multi-pixel sensor. In more detail, the pixels used by presence sensor may be of greater optical aperture or lower resolution than any pixel used by the touch sensor.

According to a second aspect of the presence invention, there is provided a consumer electronic device such as a camcorder, camera, music player, mobile phone, media player or computer, comprising a touch sensitive display device as described above.

According to a third aspect of the presence invention, there is provided a consumer electronic device having a touch sensitive user interface, the device comprising: an input to receive data defining a touch sensitive image for display; an image processor coupled to said input, to receive said data defining a touch sensitive image for display and to output distortion compensated image data for said touch sensitive image for display; image projection optics including a spatial light modulator coupled to said image processor configured to project towards a surface at an acute angle to the surface to provide a projected image for said touch sensitive user interface; a remote touch sensing system for said touch sensitive user interface comprising an illumination system configured to illuminate a region adjacent said projected image, and an image capture system to capture scattered light from said illuminated region resulting from touching said projected image; a power management system to control power to switch off at least said illumination system of said remote touch sensing system in response to absence of use of the consumer electronic device and to switch on at least said illumination system of said remote touch sensing system in response to detection of proximity of a user of the consumer electronic device.

There may further be provided the above consumer electronic device, wherein said power management system is coupled to receive a user presence signal from said remote touch sensing system to control said switch on of said illumination system.

There may further be provided the above consumer electronic device, further comprising a second remote presence sensing system wherein said power management system is coupled to receive a user presence signal from said second remote presence sensing system to control said switch on of said illumination system.

There may further be provided the above consumer electronic device, wherein said image processor or a further processor is coupled to receive touch position data from said remote touch sensing system, and wherein said touch sensitive image for display is selected or modified responsive to said touch position data.

According to a further aspect of the present invention, there is provided a method corresponding to the above first aspect, optionally with any combination of the above features which may be provided in the first aspect.

According to a further aspect of the present invention, there is provided a method corresponding to the above second aspect, optionally with any combination of the above features which may be provided in the second aspect.

According to a further aspect of the present invention, there is provided a method corresponding to the above third aspect, optionally with any combination of the above features which may be provided in the third aspect.

Proximity Control

According to a first aspect of the present invention, there is provided a touch sensitive image display device for projecting a touch sensitive displayed image at an acute angle onto a surface on which the device is placed, the device comprising: a light source to project a first light distribution; a light source to project a second light distribution; a multi-pixel sensor system to remotely detect location of touch of an area of said surface within or adjacent to said displayed image by detecting light from said first distribution, and having an output to provide a detected touch location signal; a presence sensor system to remotely detect presence of an object at least partially within said second light distribution, and having an output to provide a detected object signal; a controller having an input to receive said detected touch location signal and an input to receive said detected object signal, and configured to control said touch sensitive image display device responsive to said signals, wherein said presence sensor system comprises at least one sensor and said detected object signal indicates at least one intensity of light received by said at least one said sensor.

Advantageously, such a display device may allow presence detection on the basis of intensity using a relatively low resolution sensor so that, for example, touch sensitive elements, which may be more expensive or consume more power, may not need to be continuously active. Thus, proximity detection by the display device may allow touch sensitive detection elements such as the light source for the first light distribution to be turned off when a user is not present. Moreover, various functions of the display device including those perceptible to the user may be "woken up" or (re)started when presence is detected and further be paused or terminated when absence of touch and/or presence is detected. Furthermore, the provision of the second light distribution, which may be closer to the user than the first light distribution, may allow approach of the user or an object towards the displayed image.

The or each light source may include projection optics such as a lens which may be, e.g., cylindrical, holographic or lenticular, in particular for providing a substantially two-dimensional distribution such as a sheet distribution. The provision of the multi-pixel system may allow detection of location of touch, for example where receiving of light from the first distribution in respective distinguishable pixels of the sensor system provides a location identifier or even coordinates of the touch location. Further advantageously, such a location indication may be mapped to a corresponding location of the input image by using a look up table or calculations to compensate for distortion due to the acute angle projection.

Preferably, the presence system comprises a low resolution sensor, e.g. a single-pixel sensor such as a photodiode, phototransistor or charge-coupled device. (Any one of the sensors described herein may indicate light intensity and/or location, wherein any such indication of intensity may be binary, M-ary (where M>2) or analogue).

For projecting the displayed image, the display device may comprise image projection element(s), such as a projector. This may include a light source comprising any combination of, e.g. a coherent light source, a light emitting diode, a filament lamp and/or a fluorescent lamp. In particular, and advantageous where a dynamic image is to be displayed (i.e. one that is updated in response to touch or presence detections), the display device may comprise a spatial light modulator (SLM), which may comprise individually addressable pixels driveable according to image data, and which may for example be a liquid crystal device pixellated device such as a LCOS (liquid crystal on silicon) device and may be a transmissive or reflective device. Such an SLM may be a reflective or transmissive type, for example a liquid crystal-based element such as LCOS. An embodiment including the SLM may further comprise image projection optics comprising at least one light source to eliminate the SLM, and output optics to project modulated light from the SLM onto the surface at the acute angle.

Particularly advantageously, the use of holographic projection may allow wider throw angle, longer depth of field, and/or very substantial distortion correction without substantial loss of brightness/efficiency, compared to a non-holographic projector. Therefore, in an embodiment, the above image projection optics may be holographic image projection optics, the light source to eliminate the SLM may comprise a coherent light source so that the modulated light is coherent light, and the touch sensitive image display device may then be configured to holographically project a touch sensitive displayed image at the acute angle. The target image displayed on the SLM itself may then be a hologram. Thus, data defining an image for display may comprise data defining at least one image for display on the SLM to replay a target image distorted to compensate for projection onto the surface at the acute angle.

Further regarding the sensor system, the at least one sensor may comprise a plurality of separate sensors, as compared to a multi-pixel sensor having a plurality of pixels all combined within the same sensor. Each of the at least one sensors may be for example a single-pixel or two-pixel sensor, and preferably has a lower number of pixels (i.e. lower resolution) than a multi-pixel sensor of the multi-pixel sensor system.

The indication of intensity may be a digital (binary or m-ary) or analogue signal indicating light power or energy received in one or more of said at least one sensor, e.g., received in a sole single pixel sensor, or the signal may indicate total power received in a plurality of distributed sensors, or may provide individual indications of intensities of respective sensors.

With further regard to the at least one sensor, there may be provided the above touch sensitive image display device, wherein presence sensor system has lower spatial resolution than said multi-pixel sensor. Thus, the presence sensor system may be, e.g., a single-pixel or a two-pixel sensor system compared to a multipixel sensor having more pixels having the same optical aperture. There may be provided the above touch sensitive image display device, wherein at least one said presence sensor comprises a single-pixel sensor.

There may further be provided the above touch sensitive image display device, wherein said first light distribution is substantially two-dimensional. For example, the distribution may be a sheet of light, preferably substantially parallel to the surface where the image is displayed. This applies similarly to the above touch sensitive image display device, wherein said second light distribution is substantially two-dimensional.

Furthermore, the second distribution may be arranged to be above the first distribution when the device is used, for example one to two centimetres above. Further still, the first distribution is preferably close to the surface where the image is displayed, for example less than about three millimetres above the surface. Preferably, the first distribution is sufficiently close that the user feels that the device is responsive to actual touch of the surface where the image is displayed rather than merely presence in the first distribution above the surface.

Alternatively to a substantially two-dimensional second light distribution, there may be provided the above touch sensitive image display device, wherein the second light distribution is a three-dimensional volume. For example such a volume may be, e.g., a cone or a cylinder.

Moreover, there may be provided the above touch sensitive image display device, wherein said presence detection detects proximity of said object to said first distribution. Thus, where the presence detection system is configured to detect presence in locations adjacent to the first distribution and/or displayed image, a change (e.g. decrease) of the detected intensity may indicate that an object is proximate to the first distribution and/or displayed image. This may be distinguishable from, for example, the object being located directly above the first distribution and/or displayed image. Thus proximity may mean lateral proximity and/or vertical proximity, wherein lateral is in a direction parallel to the surface on which the image is displayed and vertical is normal to that surface area.

There may further be provided the above touch sensitive image display device, wherein said presence detection detects hovering of said object proximate to said first distribution. This may particularly be achievable where presence is detected in the second distribution while no touch detection occurs. Furthermore, detection of hovering may allow detection of when an object is present but not moving in the second distribution, e.g., when a user remains present but has paused activity.

Particularly and advantageously for power management, e.g. reducing power consumption, there may be further provided the above touch sensitive image display device, wherein said responsive control comprises changing power of said first light distribution. Such power increase may involve activating or switching off the first light distribution, e.g. by switching off the corresponding light source. "Changing" power may mean either increasing or decreasing power. Thus, the power may be increased when a presence is detected and/or decreased when absence of touch and/or presence is detected.

Particularly advantageous from the user's perspective, there may further be provided the above touch sensitive image display device, wherein said responsive control comprises displaying a further image adjacent to or at least partially overlapping said displayed image. Thus, a further image (e.g., a sub-image such as a menu or a button) e.g., stop, start, fast forward, rewind) may only appear when the user is interacting with the display device. Such a further image may replace a portion of the displayed image or be displayed as a watermark on the displayed image. Additionally or alternatively, the further image may substantially fully overlap with the displayed image and may be a screensaver that allows projection at a lower power than that required for a more complex displayed image.

There may be further provided the touch sensitive image display device, comprising a transceiver having said second light distribution light source and said presence sensor system.

In particular, there may be further provided the above touch sensitive image display device, configured to repetitively pulse said second light distribution. More specifically, the controller, which may be in the form of a processor such as an image processor, may control the pulsing or the light source itself may be self pulsing. The repetitive pulsing may be periodic. (Pulsing of one or more of the distributions as mentioned throughout this specification may enable rejection of at least some of the ambient light in a corresponding sensor system detection, particularly where a PLL is used as further described herein. Where pulsing is used, the background/ambient signal level may be read as frequently, preferably twice as frequently, as the pulsing of the corresponding light source).

Further in this regard, there may be provided the above touch sensitive image display device, wherein said sensor system is configured to perform said object detection when said second light distribution is pulsed on. This may advantageously help to distinguish a detected light signal from a background light level, particularly if a measurement of the background light level is made when the second light distribution is off. Further still, there may be provided such a touch sensitive image display device, wherein said controller is configured to read in said detected object signal synchronous with said pulsing. This may be achieved by providing a phase locked loop (PLL) in the device to provide an indication of phase and/or frequency of the distribution pulsing, and controlling the reading/detecting according to the PLL output. In particular, the PLL may be used to ensure that a received signal for detection has the same frequency and/or phase as the frequency and/or phase of distribution pulsing, and this may help to improve a signal-to-noise ratio in the detection.

In line with the above, there may be provided the above touch sensitive image display device, wherein said sensor system is configured to detect a background light intensity level when said second light distribution is off. Such a detection may occur between on pulses of the second light distribution. Moreover, the use of a background light intensity level value may allow use of a lower power light source for the second distribution, which may not need a high power level to dominate background light.

There may be further provided the above touch sensitive image display device, wherein said controller is configured to perform said responsive control on the basis of said detected object signal and said background light intensity level. For example, the responsive control may be performed on the basis of a difference between the signal and intensity level in the case where the signal provides an analogue or digital indication of a received light level.

There may further be provided the above touch sensitive image display device, further comprising a spatial light modulator (SLM) and a controller to control said SLM, on the basis of data defining said displayed image, to replay a target image distorted to compensate for projection onto said surface at said acute angle. In such an embodiment, the controller may process input data defining the (preferably un-distorted) image to be displayed to generate data suitable for modulation of the SLM to project the image such that the image as projected on the surface appears substantially un-distorted. The replay of the target image may mean driving a pixelated SLM according to target image data.

There may further be provided the above touch sensitive image display device, wherein said second light distribution light source is a light emitting diode, laser, filament lamp or fluorescent lamp.

According to a second aspect of the present invention, there is provided a consumer electronic device such as a camcorder, camera, music player, mobile phone, media player or computer, comprising the above touch sensitive image display device. For example, the display device may allow a camcorder user to preview a recorded video sequence by observing a sequence projected at an acute angle on to a surface on which the camcorder stands.

According to a further aspect of the present invention, there is provided a method corresponding to the above second aspect, optionally with any combination of the above features which may be provided in the second aspect.

Thus the invention generally provides methods corresponding to the above-described devices, and processor control code, in particular on a carrier, to implement the methods.

The carrier may be, for example, a disk, CD- or DVD-ROM, or programmed memory such as read-only memory (Firmware). The code (and/or data) may comprise source, object or executable code in a conventional programming language (interpreted or compiled) such as C, or assembly code, for example for general purpose computer system or a digital signal processor (DSP), or the code may comprise code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The skilled person will appreciate that features of the above-described aspects and embodiments of the inventions may be combined.

In conclusion, the invention provides novel systems, devices, methods and arrangements for display. While detailed descriptions of one or more embodiments of the invention have been given above, no doubt many other effective alternatives will occur to the skilled person. It will be understood that the invention is not limited to the described embodiments and encompasses modifications apparent to those skilled in the art lying within the spirit and scope of the claims appended hereto.

DETAILED DESCRIPTION

The following describes an embodiment of a touch sensitive image display device. The embodiment includes a projector for projecting a touch sensitive displayed image at an acute angle onto a surface on which the device is placed. The acute angle is generally less than 90° from the surface where the image is displayed. The angle may be pre-determined or may be adjustable by, for example, moveable optics. The projection optics may comprise a Texas Instruments (registered trademark) digital light processor, a LCOS imager and/or a laser scanner. Furthermore, there may be a projection lens that is moveable or set at a pre-determined angle for projecting the image. Optionally, the image may be projected indirectly to the surface, by first projecting the image to a mirror attached to the housing of the projector, the mirror being arranged to be further from the surface than the projector itself so that the resulting displayed image may be larger.

The projector projects the image on the basis of data defining a desired image. The data may be received in an image processor of the projector from a data input receiving data from a source internal or external to the display device. Furthermore, the image processor may have code for calculating a target image for projection, such that the displayed image as observed by the user does not suffer distortion resulting from the acute angle. Additionally or alternatively, such anti-distortion calculations may account for distortion due to curvature of the surface on which the image is displayed. Such compensation may be carried out by forward or reverse mapping between the (preferably undistorted) input image data and the target image, and may involve cropping of image data. (In alternative embodiments, the acute angle projection may be achieved by providing a stand for supporting the display device or at least the projector though at a pre-determined or adjustable angle.

Specifically regarding compensating for curvature, the projector may be used to scan, e.g., known shapes, patterns and/or lines onto a surface and any described multi-pixel sensing system may be operated 'synchronously' to capture an image to correlate. The captured images may be used to compute a 3-D surface profile. The profile information may then be used to create a correction function, e.g., look-up table, for images projected onto that surface.

FIG. 1 shows the display device 1 comprising a projector 2, sensor systems 3 and 4, light source 5 associated with output optics 5a and light source 6 associate with output optics 6a. (Alternatively, the sensor systems 3 and 4 may be combined such that a single sensor 7a or 7b with optional anti-distortion processor AD1, AD2 can be shared for both presence and touch sensing. This is shown by the dashed lines in FIG. 1, particularly in relation to the anti-distortion units AD1 and AD2 which may be comprised in the sensor system(s) or in the controller C). FIG. 1 further shows that the light source 6 projects a first light distribution d1 over the displayed image Im, and light source 5 projects a second distribution d2' over the first distribution. The first distribution is preferably less than about 3 mm from the surface where the image is displayed and the second distribution d2 may be about 1 to about 2 cm above the first distribution. (FIG. 1 further shows that a further distribution, or any number of further distributions d3, may be used to allow detections at different levels above the displayed image).

Regarding the user interface, FIG. 1 shows that a finger f may be detected touching the displayed image on the basis of sensing light from the first distribution d1. Similarly, presence of the finger f in the distribution d2 may be detected, and this applies further to any further distributions d3. Thus, the user may be able to control the device by "touching" at different levels. Furthermore, detection using the distribution d2 can be used to protect proximity or approach towards the displayed image. In more detail, regarding the equations shown in FIG. 1, the difference between two positions such as p1 and p2, which positions are detectable by sensors 7a and 7b if these are multi-pixel sensors, may result in the selection of a function to be performed by the controller c. The positions may be locations of touch or presence in one particular distribution or may be locations in different distributions. In this way, a versatile user interface may be provided such that, for example, the user can control the device in a joystick-like manner by using his finger, a stylus, pen, etc.

Figure 2:
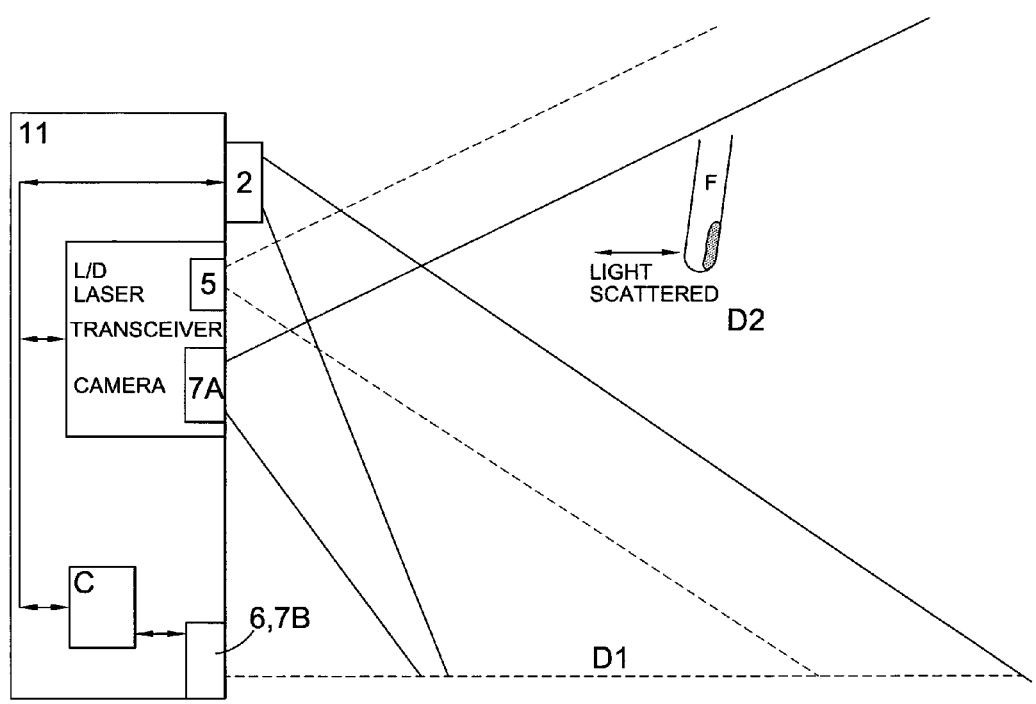
FIG. 2 shows a display device of an embodiment.

FIG. 2 shows an embodiment of a display device 11 with corresponding elements as described above in relation to FIG. 1. Specifically, FIG. 2 shows that the combination of light source 5 (with any required output optics 5a) and sensor 7a may be provided in the form of a transceiver, including, e.g., a laser and camera. Moreover, the embodiment of FIG. 2 illustrates that the second optical distribution d2 may be a three-dimensional volume such as a cone. As with FIG. 1, sensors 7a and 7b may detect light reflected or scattered from an object such as finger f. Particularly in the case where the sensor 7a is a low resolution sensor such as a single pixel sensor, the embodiment of FIG. 2 may provide a less complex apparatus when it is merely required to detect whether or not an object is near, i.e., proximate to a displayed image, whether this is for allowing power management, an improved user-interface or even for safety (e.g., if any light source such as that of the projector is a laser). This may be achieved by detecting the intensity of light scattered from an object. A suitable action taken by the controller c in response to such a detection may be to turn on any element of the device 11, such as the light source 6 and/or projector 2 (in particular the light source of the projector). For example, the touch sensing system may be disabled when a user is not interacting with the display device.

Thus, as in any one of the embodiments of the present invention described herein, power hungry devices may be switched on, or at least have their power increased, only when proximity is detected. Similarly, a further, e.g., sub-, image can be displayed with the above-mentioned displayed image in response to the detection. For the power management, it is further noted that absence of detections of touch and distribution d1 can be used to switch off or reduce the above powers. Consequently, it may be possible in any one of the embodiments described herein to reduce power consumption and/or to display further images with the above mentioned display image only when the user is interacting with the device. Thus, embodiments may provide power saving features and/or a better interface for the user.

Figure 3A:
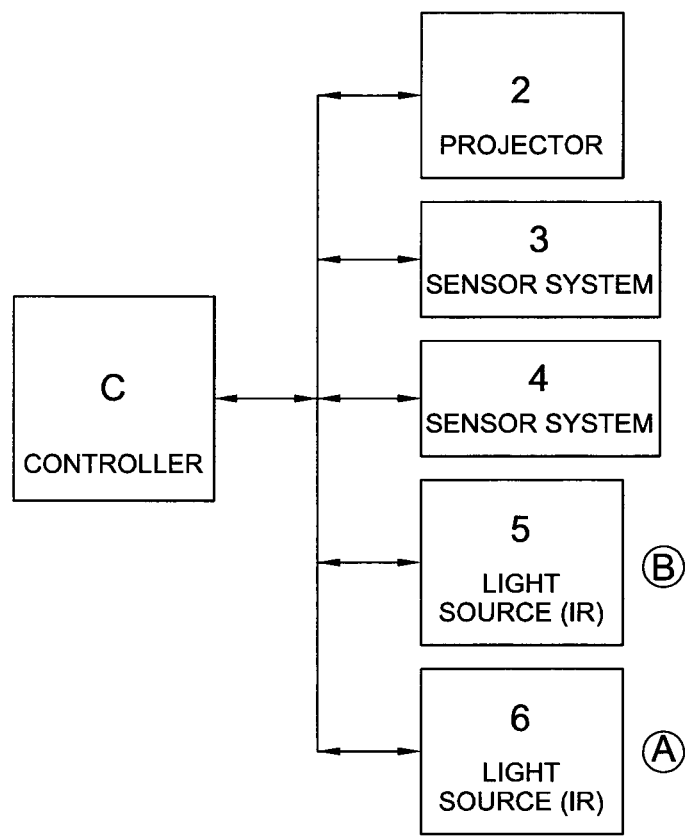
FIG. 3a shows a basic block diagram of elements relating to FIGS. 1 and 2.

FIG. 3a shows a basic block diagram of elements described above in relation to FIG. 1 or 2. It is noted that, in some embodiments, the sensor systems 3 and 4 may be a combined system that multiplexes in wavelength or time sensing and/or projecting of light of the distributions. In more detail, FIG. 3a shows that the light sources may be infra-red. (It is noted that any indication of direction(s) of signal transmission between blocks in any block diagram of this specification is purely for example only and does not require bidirectional transmission on any link).

The sensor system 3 may be a multi-pixel power sensor such as a camera for calculating location (position). A second sensor is provided for the sensor system 4, this may be a single pixel or at least have a lower number of pixels than the sensor(s) of system 3. Thus, the sensor system 3 may be suitable for detecting location of a touch while the system using the second sensor may be suitable merely for detecting presence or motion. The light source 6 may provide a substantially two-dimensional sheet just above the surface where the image is displayed, this sheet being used to do the touch sensing. For the second light source 5, a further substantially two-dimensional sheet of light may be protected or alternatively the distribution may be a three-dimensional cone or volume of light.

Figure 3B:
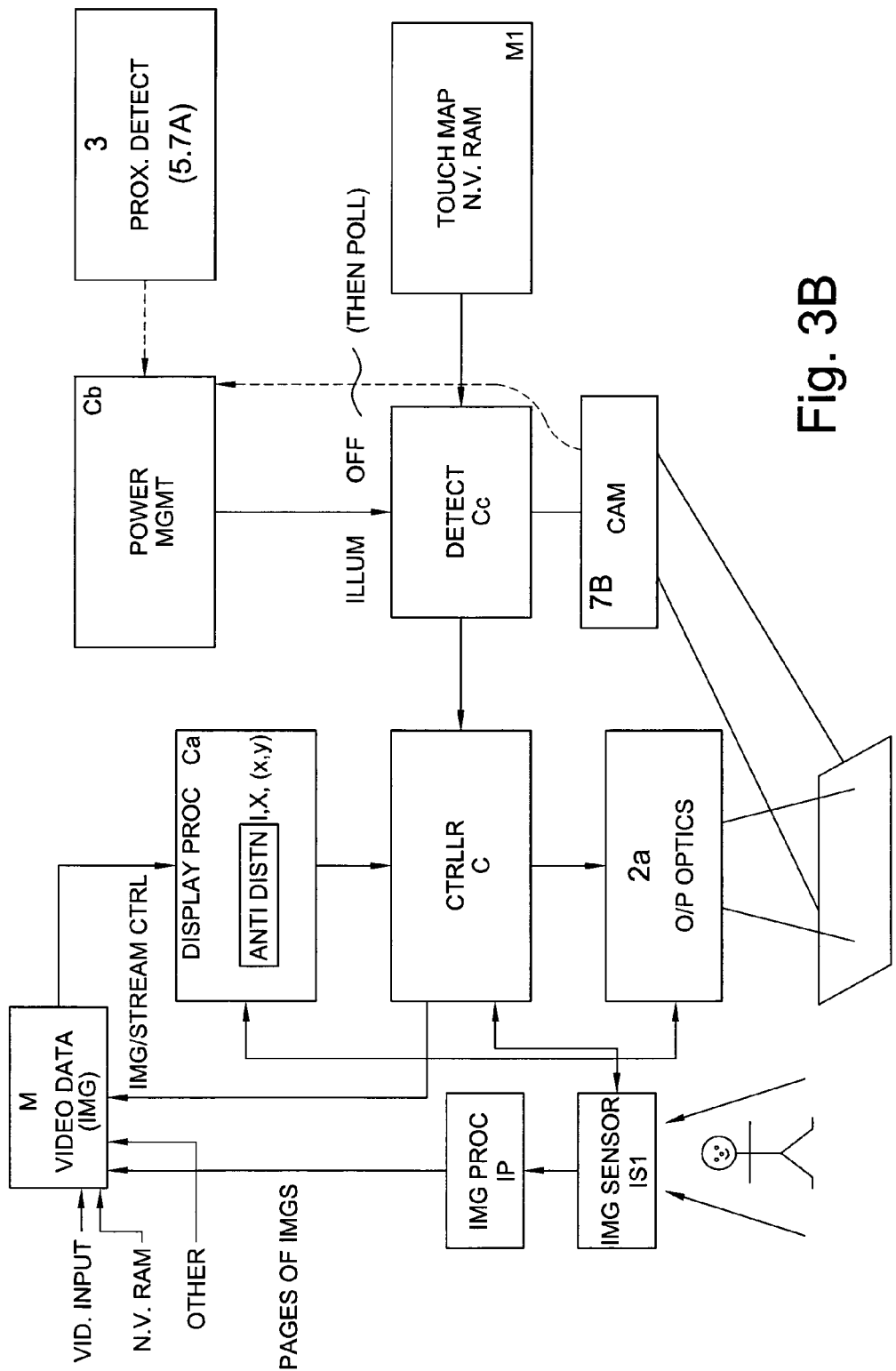

A more detailed block diagram of a further embodiment having any of the above features discussed in relation to FIGS. 1-3, and having corresponding elements, is shown in FIG. 3b. This detailed arrangement may be implemented within a consumer electronic device such as a camcorder, computer, mobile phone etc.

As may be found in any one of the embodiments described herein, a memory M is provided for image or video data. The image data/pages may be derived from a video input, non-volatile ram storage or any other source. (The image sensor IS1 is optional and may be present in a device for recording video or still images, such as a camera or camcorder; the image processor IP is a further optional part associated with the image sensor IS1). The memory may be a self-contained unit or found within the projector or the controller C.

The output optics 2a are generally associated with the projector 2. The display processor Ca, power management Cb and detect unit Cc are all associated in FIG. 3b with the controller C. However, they may be provided in other units coupled to the controller C. A proximity detect block corresponding to a sensor system 3 is shown coupled to the power management block Cb and may comprise the light source 5 and detector 7a. Furthermore, an output from a detector 7b in the form of a camera for detecting location of a touch is shown coupled to the power management block Cb. On the basis of these two inputs, the power management can control illumination of the first distribution for touch and/or of the displayed image off, or at least reduce the power used for these processes. The illumination may be controlled off after a period of absence of touch detects and the proximity detector may be pulled thereafter until proximity is detected so that the illumination can be turned back up to full power.

FIG. 3b further shows a memory M1 that may be used to map locations of detected touches to locations of the preferably un-distorted input image so that anti-distortion compensation can be formed. The touch map memory M1 may be used to implement a look up table for anti-distortion compensation.

Figure 3C:
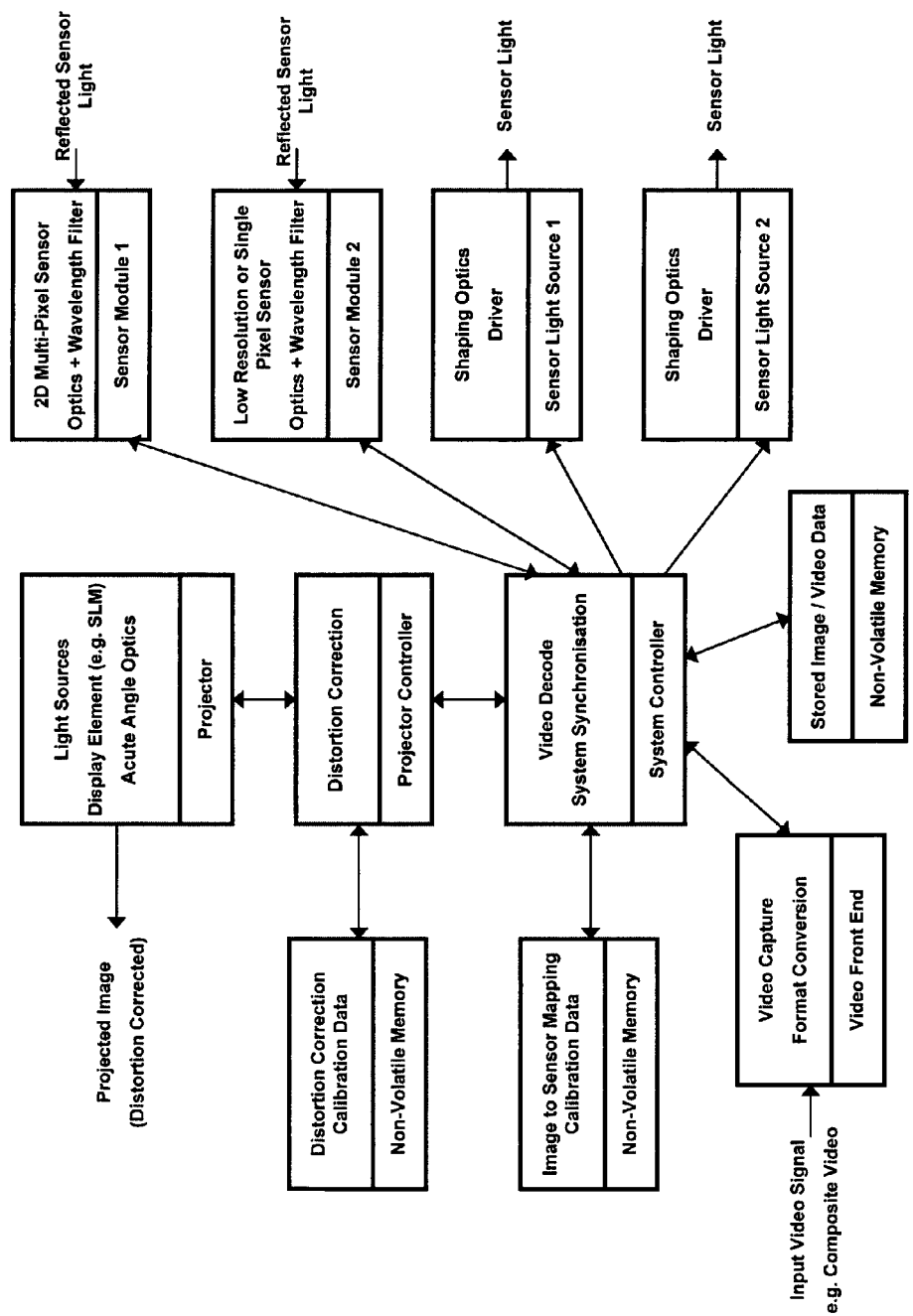
FIG. 3c shows a more detailed block diagram of an embodiment.

FIG. 3c shows a yet more detailed block diagram that may correspond to elements of any one of the embodiments described in this specification.

Figure 4:
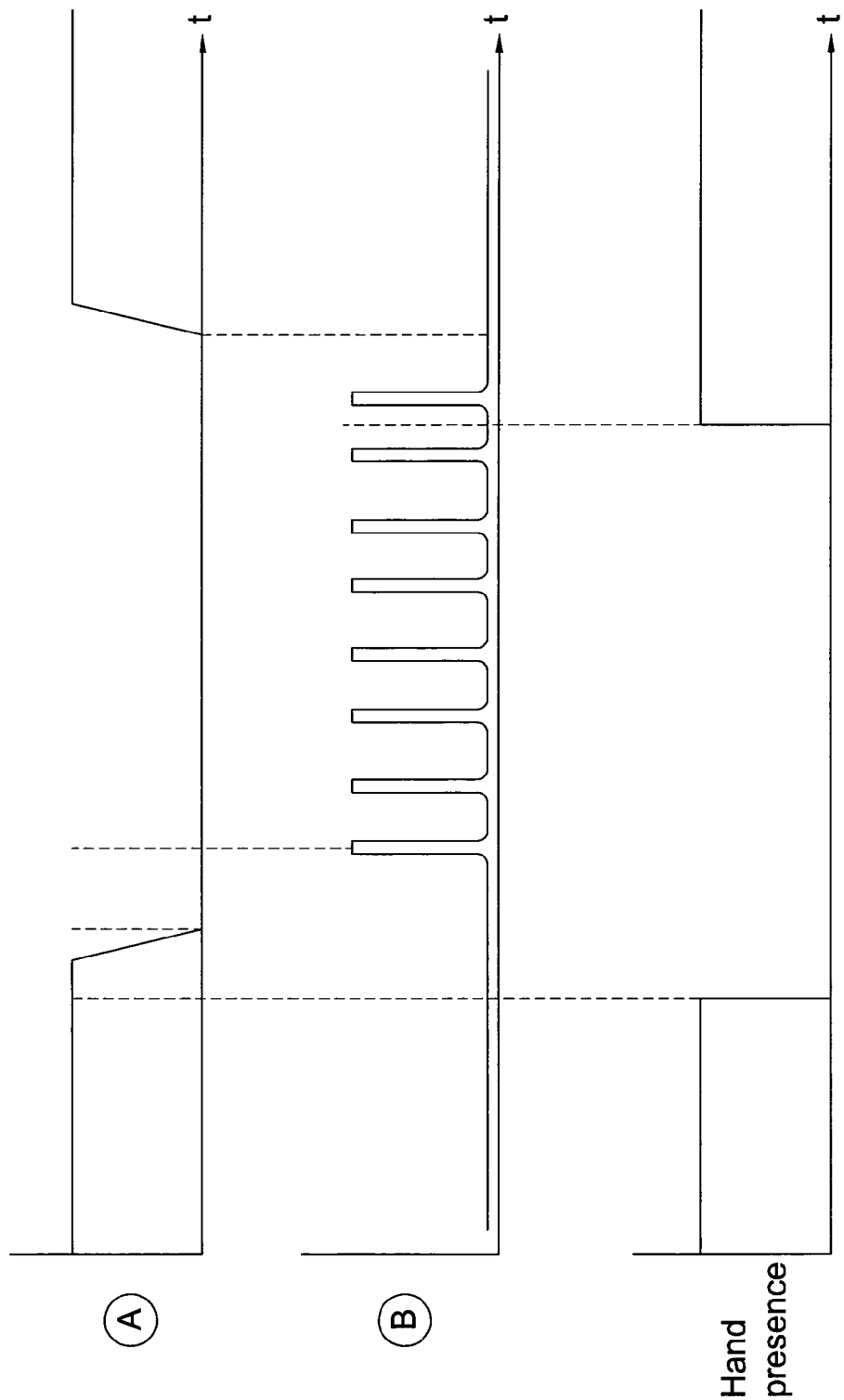
FIG. 4 shows a timing diagram for illustrating a first mode of operation of an embodiment.

FIG. 4 shows a timing diagram for illustrating a first mode of operation of any one of the embodiments described herein. The mode is particularly advantageous in an embodiment where the above power management is implemented. The upper trace of FIG. 4 shows relatively high power in the first distribution when projection from the light source 6 is active. The lower trace shows lower power in the second light distribution due to low duty cycle of projection from the light 5. In other words, FIG. 4 shows that the first light source for touch sensing by means of the distribution d1 may provide a relatively high power light distribution when active, in comparison to the average power of the second distribution generated by the other light force. In the case shown in FIG. 4, the lower power may be due to a lower duty cycle where the second distribution is pulsed on and off repetitively.

As further shown in FIG. 4, while a hand or other object is present as detected by the touch and/or presence sensor system, the high-power first distribution source is maintained on. However, when absence of such an object is detected, the higher power source is turned down or switched off and polling for proximity begins by pulsing the lower power second distribution d2. When proximity is detected in the distribution d2, because the hand or other object has returned, the relatively higher power first distribution source for touch sensing is switched back to full power operation once more.

Figure 5:
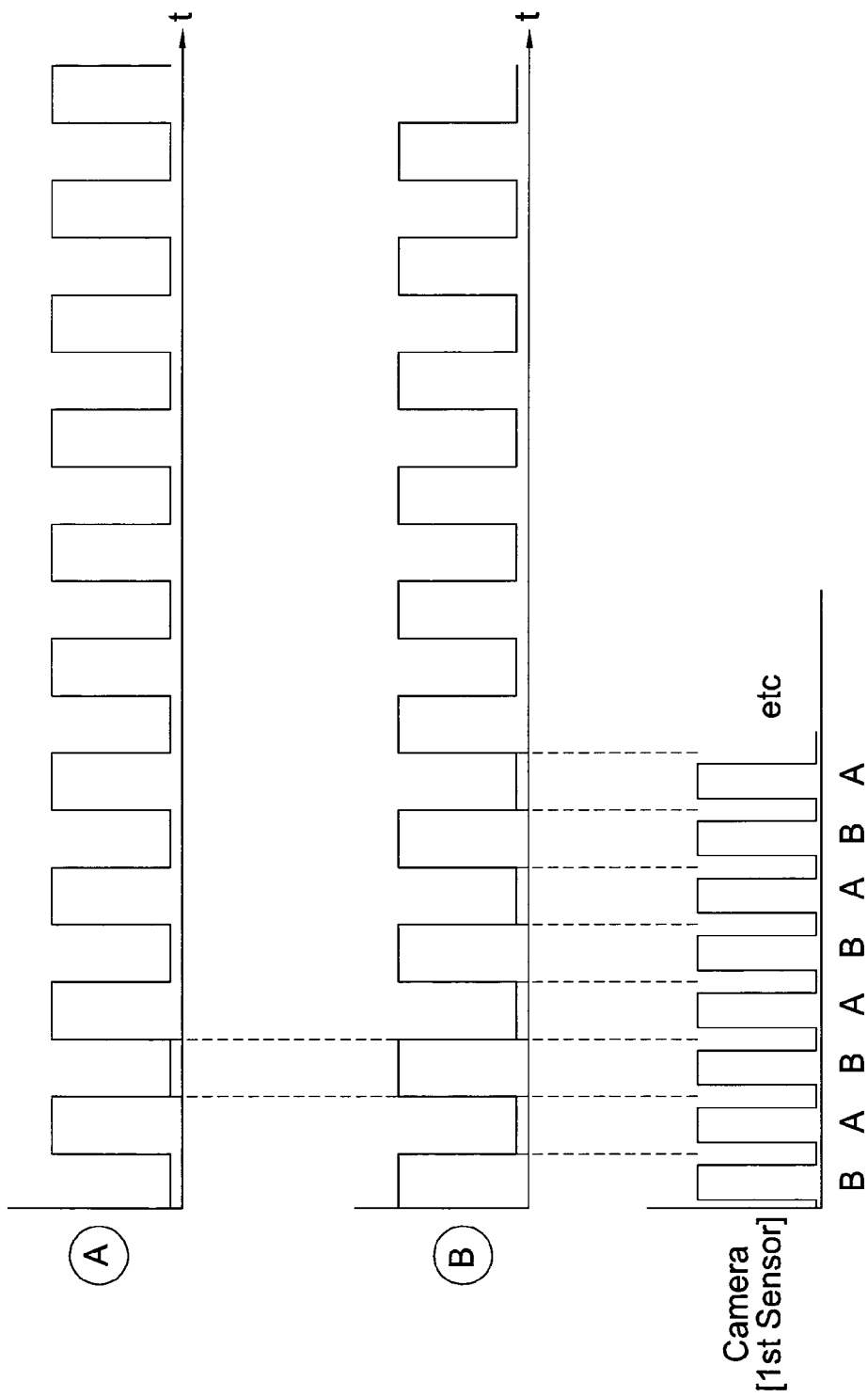
FIG. 5 shows a timing diagram of multiplexing of detection in the time domain in an embodiment.

FIG. 5 shows a timing diagram of multiplexing of detection in the time domain. This may be used in any one of the embodiments to reduce the component count required for the device, e.g., by requiring a single light source and/or single sensor system. The upper trace shows projection in the lower (preferably infra-red (IR)) layer. The lower trace shows projection in the upper (IR) layer. As shown in FIG. 5, the light distributions d1 (lower IR layer) and d2 (upper IR layer) are switched to full power alternately. In this case, a single sensing system or even sensor may be configured to provide touch and presence detection signals synchronous with the alternating, such that the identification of each signal as being of touch or presence may be identified at least by the timing of the detection.

Figure 6:
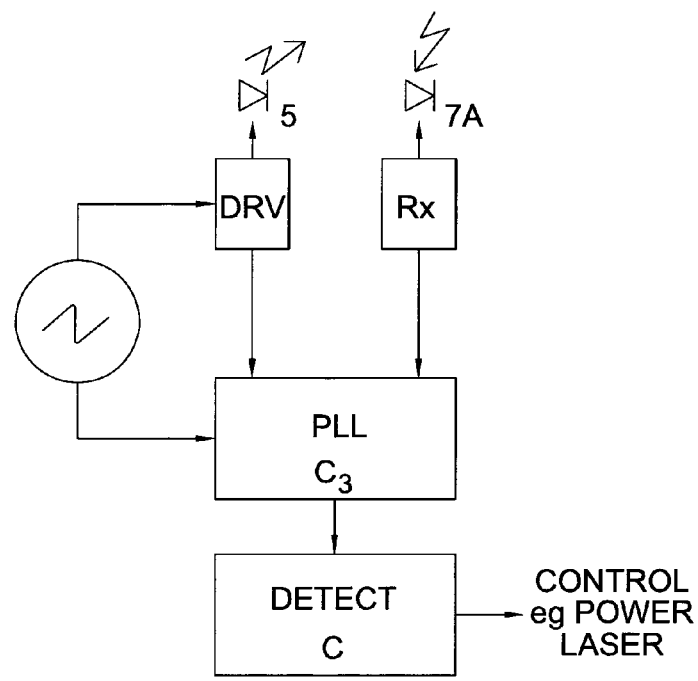
FIG. 6 shows an arrangement including a phase locked loop for synchronizing distribution projection and receiving of detection signals in an embodiment.

With further regard to pulsing of the distribution d2, or for that matter of any other distribution such as d1 or any further distribution where implemented for example to save power, FIG. 6 shows that a phase locked loop (PLL) may be used to synchronise the distribution projection and receiving of light signals for detection such that, for example, a power laser, may be controlled accordingly. An advantage of such an implementation may be reduction of signal to noise ratio in the detection signals, since the sensor output can be filtered to obtain detection signals occurring at the same frequency and/or phase as the distribution pulsing, for example. The PLL may be part of the controller c for acting on the detection, or may be in a different device component.

Figure 7:
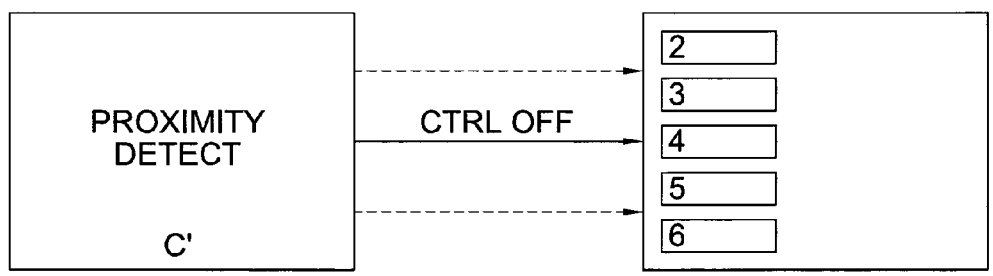
FIG. 7 shows how a controller C may determine a proximity detect signal in an embodiment.

FIG. 7 shows that, in any of the embodiments described herein, the controller C may determine a proximity detect signal and on this basis control one or more elements of the device to be switched on/off or switched to a lower/higher power mode. A plurality of such control signals may be provided, for example for controlling pre-determined touch sensor elements such as the light distribution d1 light source off or for tuning the projector 2 or at least the light source thereof off.

Figure 8:
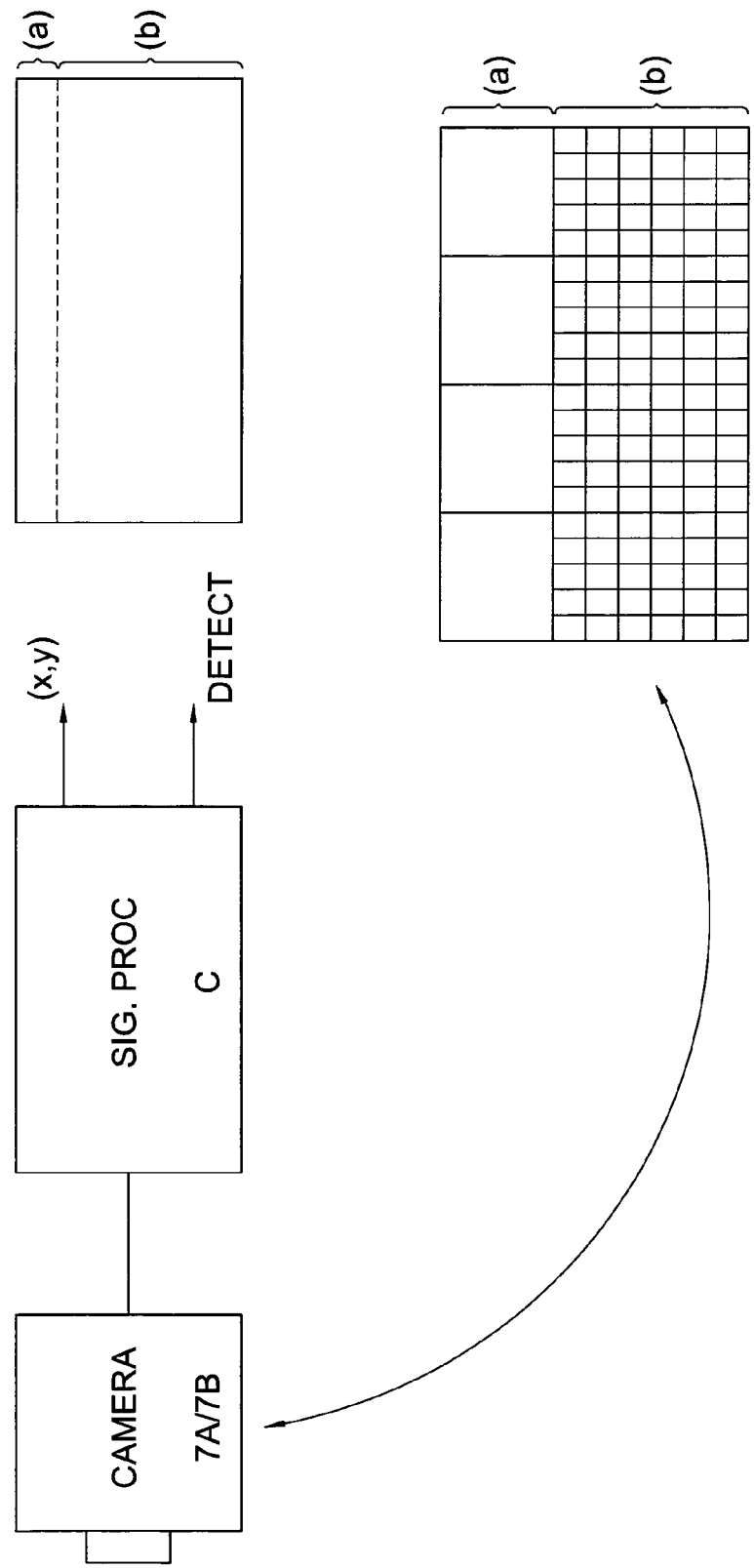
FIG. 8 illustrates a shared a multi-pixel sensor in an embodiment.

FIG. 8 illustrates a principle applicable in any one of the embodiments described herein, wherein the sensor systems 3 and 4 may share a multi-pixel sensor. The camera functions as the sensor 7a, 7b and has an array of pixels that may have a grid format such as that shown in the lower portion of FIG. 8. A signal processor which may be found in the controller c outputs on the basis of the camera output a location such as co-ordinates (X,Y) and a detection signal. (The location may even indicate which distribution the location has been detected in). As shown in FIG. 8, the resolution of the pixels used for proximity detector detection (shown at the top of the grid) may be lower than those used for touch location sensing. As shown in the top right diagram of FIG. 8, the controller may have knowledge of co-ordinate or locations corresponding to mere proximity and those corresponding to a detected touch location on the displayed image. Furthermore, the controller may have memory and/or processing for mapping the displayed image co-ordinates to input image regions including to compensate for distortion due to the acute angle or curvature of the surface.

Figure 9:
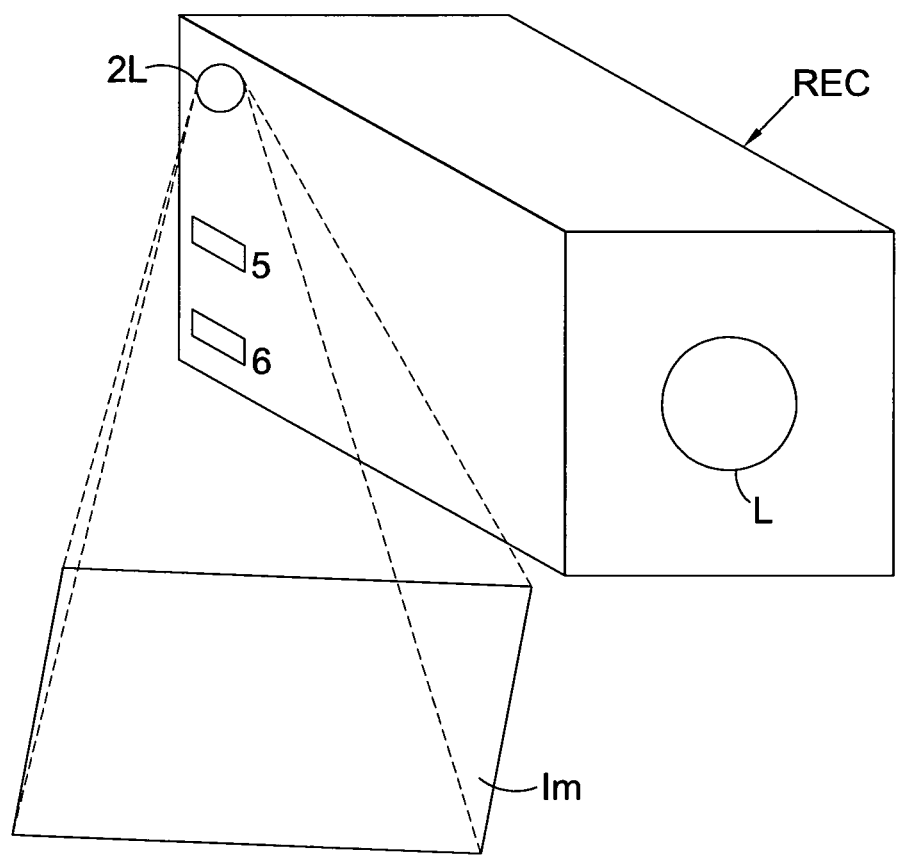
FIG. 9 shows a consumer electronics device such as a camcorder including a touch sensitive image display device.

FIG. 9 shows a consumer electronics device REC such as a camcorder including a touch sensitive image display device of any one of the embodiments described herein. In FIG. 9, there is shown an optional lens of the device for recording video, a output optics lens of a projector 2 of the touch sensitive image display device, the display image Im, and light sources 5, 6 (which may be combined, i.e. comprise a single, shared light source). Such a device may include elements of any embodiment described herein in any combination, in particular those of the block diagrams described.

The following relates to the above-mentioned anti-distortion compensation and is applicable in any embodiment described herein, in particular those using an SLM and in particular holographic projection.

In embodiments of a device using an SLM as describe above, especially where diffraction is employed, light from the entire illuminated area of the SLM may be directed into the distorted target image field. Moreover, the displayed image is substantially focus-free; that is the focus of the displayed image does not substantially depend upon the distance from the image projection system to the display surface. A demagnifying optical system may be employed to increase the divergence of the modulated light to form the displayed image, thus allowing an image of a useful size to be displayed at a practical distance.

The field of the displayed image may suffer from keystone distortion, the trapezoidal distortion of a nominally rectangular input image field caused by projection onto a surface at an angle which is not perpendicular to the axis of the output optics. Thus the image projection system internally generates a target image to which the inverse distortion has been applied so that when this target image is projected the keystone distortion is compensated. The target image is the image to which a transform is applied to generate data for display on the SLM. Thus in some preferred embodiments the system also includes non-volatile memory storing mapping data for mapping between the input image and the target image.

To convert from the input image to the target image either forward or reverse mapping may be employed, but preferably the latter, in which pixels of the target image are mapped to pixels of the input image, a value for a pixel of the target image then being a assigned based upon lookup of the value of the corresponding pixel in the input image. Thus in some preferred embodiments the trapezoidal shape of the target image field is located in a larger, for example rectangular target image (memory) space and then each pixel of the target image field is mapped back to a pixel of the (undistorted) input image and this mapping is then used to provide values for the pixels of the target image field. This is preferable to a forward mapping from the input image field to the distorted target image field for reasons which are explained below. In either case, however, in some preferred embodiments the transform is only applied to the distorted, generally trapezoidal target image field rather than to the entire (rectangular) target image memory space, to avoid performing unnecessary calculations.

Where reverse mapping as described above, is employed preferably compensation is also applied for variations in per unit area brightness of the projected image due to the acute angle projection. Thus while diffraction from a given pixel of the SLM may contribute to substantially an entire displayed hologram (where holographic projection is used in an embodiment), nonetheless the diffracted light from this pixel will be distorted resulting in more illumination per unit area at the short-side end of the trapezoid as compared with the long-side end of the trapezoid. Thus in preferred embodiments an amplitude or intensity scale factor is applied the value of which depends upon the location (in two dimensions) of a pixel in the target image space. This amplitude/intensity compensation may be derived from a stored amplitude/intensity map determined, for example, by a calibration procedure or it may comprise one or a product of partial derivatives of a mapping function from the input image to the anti-distorted target image. Thus, broadly speaking, the amplitude/intensity correction may be dependent on a value indicating what change of area in the original, input image results from a change of area in the anti-distorted target image space (at the corresponding position) by the same amount.

As mentioned above, rather than a reverse mapping a forward mapping from the input image space to the distorted target image space may alternatively be employed. This is in general less preferable because such a mapping can leave holes in the (anti-) distorted target image where, in effect, the target image is stretched. Thus mapping pixels of the input image to pixels of the target image may not populate all the pixels of the target image with values. One approach to address this issue is to map a pixel of the input image to an extended region of the target image, for example, a regular or irregular extended spot. In this case a single pixel of the input image may map to a plurality of pixels of the target image. Alternatively once pixel values of the target image have been populated using pixels of the input image, pixels of the target image which remain unpopulated may be given values by interpolation between pixels of the target image populated with pixel values. Where a single input image pixel is mapped to an extended region of the target image, these extended regions or spots may overlap in the target image, in which case the value of a target image pixel may be determined by combining more particularly summing, the overlapping values (so that multiple input image pixels may contribute to the value of a single target image pixel). With this approach compensation for per unit area brightness variation is achieved automatically by the summing of the values of the extended spots where these spots overlap in the target image field.

Preferred embodiments of the image projection system provide a multi-colour, more particularly a full colour display. Thus red, green and blue laser illumination of the SLM may be employed, time multiplexed to display three colour planes of the input image in turn. However, since the projection system may operate by diffraction, the blue light diverges less than the red light and thus in preferred embodiments the target image also has three colour planes in which a different scaling is employed for each colour, to compensate for the differing sizes of the projected colour image planes. More particularly, since the red light diverges most, the target image field of the red colour plane is the smallest target image field of the three target image planes (since the target image has "anti-distortion" applied). In general the size of the target image field for a colour is inversely proportional to the wavelength of light used for that colour. In some preferred embodiments, however, rather than a simple scaling by wavelength being applied the distortion (more correctly anti-distortion) of each colour image plane may be mapped to a corresponding colour plane of the target image field using a calibration process which corrects for chromatic aberration within the projection system such as chromatic aberration within the projection optics, chromatic aberration caused by slight misalignment between rays for different colours within the optics, and the light.

The techniques employed in preferred embodiments of the projector, in particular the holographic techniques, facilitate miniaturisation of the projector. These techniques also facilitate handling of extreme distortion caused by projection onto a surface on which the projector is placed, this extreme distortion resulting from the geometry illustrated in later FIG. 1c in combination with the small size of the projector. Thus in some preferred embodiments the surface onto which the image is projected is no more than 1 m, 0.5 m, 0.3 m, 0.2 m, 0.15 m, or 0.1 m away from the output of the projection optics 102. Similarly in embodiments the distance from the output of the projection optics to the furthest edge of the displayed image is substantially greater than the distance from the output of the projection optics to the nearest edge of the displayed image, for example 50%, 100%, 150%, 200% or 250% greater. Depending upon the geometry the acute projection angle may be less than 70°, 65°, 60°, 55°, 50°, or even 45°.

The device may also provide a forward projection mode and incorporate a stand such as a bipod or tripod stand, and preferably also a sensor to automatically detect when the device is in its table-down projection configuration, automatically applying distortion compensation in response to such detection. However in some alternative arrangements rather than mechanically tilting the device, instead the projection optics may be adjusted to alter between forward and table-down projection. This could be achieved with a moveable or switchable minor, but an alternative approach employs a wide angle or fisheye lens which when translated perpendicular to the output axis of the optics may be employed to move from forward projection to table-down projection at an acute angle.

A mapping between the input image and the anti-distorted target image may comprise either an analytical mapping, based on a mathematical function, or a numerical mapping, for example, derived from a calibration procedure or both. As previously mentioned in some preferred embodiment target image pixels are mapped to input image pixels to lookup target image pixel values. Preferably the target image is also corrected for area mapping distortion and, in a colour system, preferably the different colour planes are appropriately scaled so that they reproduced in the projection surface at substantially the same size.

In preferred embodiments of the above described systems, devices and methods preferably an (AD)OSPR-type procedure (WO2007/031797) is employed to generate the hologram data. Thus in preferred embodiments a single displayed image or image frame is generated using a plurality of temporal holographic subframes displayed in rapid succession such that the corresponding images average in an observer's eye to give the impression of a single, noise-reduced displayed image.

Advantages of the above described embodiments may include providing a video application device wherein buttons for play, stop etc., may be overlaid on the displayed video imaging only when necessary so that the video can be comfortably viewed by the user when the user is not manually interacting with the device. Similar applies to devices which may have pop-up menus, which may in particular be context sensitive depending on a location of touch, and it is preferred that these menus only appear when the user is manually interacting. A further advantage is how to reduce power of a touch sensitive display device, this being achieved by using a lower power proximity sensing system that allows the higher power touch sensing system to operate at lower power or even "sleep" when the user is not manually interacting but, e.g. merely passively observing the displayed image. Such proximity detection may further allow the device to be activated merely by a user's hand or other object approaches the displayed image rather than only by direct touch activation. Thus, power saving and/or a better interface may be achievable.

It is particularly noted that the projector in any one of the embodiments described herein may be holographic since this may advantageously provide a wide through angle long depth of field and very substantial distortion correction with less loss of brightness/efficiency than in non-holographic projectors. These techniques are described in our UK patent application number GB0822336.4 filed on Dec. 8, 2008 hereby incorporated by reference in its entirety.

Thus in embodiments the mapping between a target image for display and an input image is described by a pair of polynomial expansions and, more particularly by two sets of polynomial coefficients for these expansions. If we refer to the target image space using coordinates (x', y'), and the input image using coordinates (x, y) then we can define a location (x, y) in the input image space as a pair of functions f', g' of the coordinates in the (anti-distorted) target image space, as follows:

$$f'(x', y') \to xg'(x', y') \to y$$

Likewise:

$$f(x, y) \to x'g(x, y) \to y'$$

For reasons explained further below, it is preferable that the mapping from the target to the input image rather than vice-versa is employed. An example pair of polynomial expansions is given below:

$$f'(x', y') = \sum_i \sum_j a_{ij} x^i y^j$$

$$g'(x', y') = \sum_i \sum_j b_{ij} x^i y^j$$

The first few terms of the polynomial expansion of f' are as follows:

$$f'(x',y') = a_{00} + a_{10}x + a_{01}y + a_{11}xy + a_{20}x^2 + \ldots$$

where broadly speaking coefficient $a_{00}$ defines position, $a_{10}$ and $a_{01}$ define scale, $a_{11}$ defines skew, and $a_{20}$ and so forth are higher order coefficients. The value of $a_{ij}$ is dependent on the angle of projection θ, on i and on j; the value of bij is similarly dependent on θ, i and j. It can be helpful to consider (x, y) space as being "camera"—that is defining what it is desired to project.

In embodiments a single pixel of the target image may maps to a plurality of pixels in the input image. This can be appreciated because the distortion effectively shortens the nearer edge of the input image as compared with the more distant edge from the output optics. Therefore in some preferred embodiments the target image is constructed by stepping through the (x', y') positions in the target image and for each looking up the addresses of the corresponding pixels in the input image and using the values from these pixels to assign a value to the corresponding pixel in the target image. Where multiple input image pixels correspond to a single target image pixel the values of the input image pixels may, for example, be summed or some other approach may be employed for example selecting a value such as a mean, medium or mode value. Thus preferred embodiments apply an inverse mapping, from the target to the input image space. By contrast mapping from the input image to the target image can leave holes in the target image, that is pixels with unpopulated values. In this case a single pixel of the input image may be mapped to a regular or irregular spot with an extended size (over multiple pixels) in the target image, optionally with a super imposed intensity distribution such as a gaussian distribution.

Once the target image T(x', y') has been created a hologram H(X, Y) of the target image is generated to approximate the following expression:

$$H(X, Y) = \sum_{i=0}^{N-1}\sum_{j=1}^{N-1} T(x', y')\exp\left(\frac{-2\pi j(ix+jy)}{N}\right)$$

where N represents the number of pixels in the hologram in the X and Y-directions (here for simplicity, the same number). The region of the target image space outside the image may be filled with zeros and therefore in some preferred implementations the evaluation of H(X, Y) is performed over a window of target image space defined by the target image, for efficiency.

In the context of table-down holographic image projection to provide a multicolor/full color display preferred embodiments of the system employ three differently scaled and/or distorted target images, one of each of the three laser colors red, green and blue-denoted R, G and B in the figure. Thus in embodiments separate functions f', g' are provided for each color, although in other embodiments a single target image/distortion map is employed and scaled according to the wavelength of the laser light used for the respective color plane, more particularly scaled by $1/\lambda$. It will be understood that each pixel of a hologram calculated from the target image contributes to substantially the whole displayed image, the displayed image is scaled in inverse proportion to wavelength—that is the blue image would be smaller because the blue light is diffracted less, and therefore the blue target image enlarged so that the projected images for the three colour planes substantially match inside.

Referring again to the polynomial expansions described above, for an inverse mapping, that is from target to input image space, where scaling is applied the (0,0) coefficients are not scaled, the (1,0) and (0,1) coefficients are scaled by reciprocal wavelength, and optionally the coefficients of higher power are scaled accordingly, for example the (1,1), (2,0), and (0,2) coefficients being scaled by $1/\lambda^2$ and so forth. Thus for example, for 440 nm blue light and 640 nm red light:

$$a_{10}^R = \frac{640}{440}a_{10}^B.$$

In other embodiments, however, a set of functions $f^{R\prime}$, $g^{R\prime}$, $f^{G\prime}$, $g^{G\prime}$, $f^{B\prime}$, $g^{B\prime}$ is employed to correct for chromatic aberration, positioning of the different colored lasers and the light.

When mapping using a forward function from the input image to the target image space the scaling applied is to multiply rather than divide by wavelength and the above approaches are adapted mutatis mutandis.

It is further desirable to correct for changes in brightness per unit area which result from the distortion in acute-angle image projecting. One approach would be to calibrate for this change and provide an anti-distortion calibration map to apply similarly to that for spatial distortion. Another approach, however, is to determine an intensity scale factor as a function of position, for example by determining what change of area in the original, input image results from a change of corresponding area in the anti-distorted space of target image by the same amount. This can be determined by determining the derivative of the target image with respect to the input image in each of two orthogonal directions in the image plane, more particularly by calculating an intensity scale factor A(x', y') according to:

$$A(x', y') = \frac{\partial f'(x', y')}{\partial x} \cdot \frac{\partial g'(x', y')}{\partial y}$$

The skilled person will appreciate that in going from an input image pixel value to a target image pixel value, if the pixel value defines an intensity then this should be multiplied by (1/A) whereas if the pixel value defines amplitude then in going from the input image to the target image the amplitude is multiplied by $(1/\sqrt{A})$.

A different approach may, however, be employed when forward mapping from the input image to the target image space. In this case where an input image pixel is mapped to an extended area or spot in the target image space area correction may be performed automatically by adding the contributions from overlapping spots in the target image space—that is a target image pixel value maybe determined by adding pixel values from input image pixels whose extended spots overlap that target image pixel.

Furthermore, the use of a spatial light modulator such as a pixellated liquid crystal device, which may be transmissive or reflective, for displaying a target image based on the input image may allow the displayed image to be updated dynamically in response to touch and/or proximity.

The above-described methods, and responsive device control, may be implemented using processor control code on a data carrier, as previously described.

The techniques described herein have may applications which include, but are not limited to, touch-sensitive displays for the following: mobile phone; PDA; laptop; digital camera; digital video camera; games console; in-car cinema; navigation systems (in-car or personal e.g. wristwatch GPS); head-up and helmet-mounted displays e.g. for automobiles and aviation; watch; personal media player (e.g. photo/video viewer/player, MP3 player, personal video player); dashboard mounted display; laser light show box; personal video projector (a "video iPod®" concept); advertising and signage systems; computer (including desktop); remote control unit; an architectural fixture incorporating an image display system; more generally any device where it is desirable to share pictures and/or for more than one person at once to view an image.

Furthermore, the features described in the detailed description above may be present in any permutation in any embodiment. As described above, an embodiment may advantageously provide a combined input-output, i.e., interactive, display having a 3-D touch interface (i.e., one that is able to detect and respond to touch/presence of an object in different spatial regions). In particular, any above-described presence sensor system, which is not arranged to detect touch of the displayed image but merely presence and/or approach and/or location in a corresponding second distribution, may be provided to allow sleep and/or wake-up detection for any element of the device, in particular of the touch sensing system comprising light source for the first distribution and touch sensor system. Any number, e.g., 3, of presence sensing systems comprising a further distribution as described above may be present.

No doubt many other effective alternatives will occur to the skilled person. It will be understood that the invention is not limited to the described embodiments and encompasses modifications apparent to those skilled in the art lying within the spirit and scope of the claims appended hereto.

In conclusion, the invention provides novel systems, devices, methods and arrangements for display. While detailed descriptions of one or more embodiments of the invention have been given above, no doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A touch sensitive image display device for projecting a touch sensitive displayed image at an acute angle onto a surface on which the device is placed, the device comprising:
    an object location detection system, said object location detection system comprising:
        a light source of non-visible light to project a non-visible light distribution for detecting the location of an object; wherein said non-visible light distribution is a substantially laminar light distribution projected above said touch sensitive displayed image;
    a multi-pixel sensor system to remotely detect location of touch of an area of said surface within or adjacent to said displayed image by detecting light from said non-visible distribution, and having an output to provide a detected touch location signal; and
    a presence detection system, said presence detection system comprising:
        a presence sensor to sense the non-visible light distribution and provide a presence sensor signal; wherein said presence sensor has fewer pixels than said multi-pixel sensor system; and
        a processor to process said presence sensor signal and determine a detected presence signal;
    wherein said touch sensitive image display device is controlled responsive to said detected touch location signal and to said detected presence signal; and
    wherein said presence detection system detects when said object is hovering proximate to but not within said non-visible light distribution.

2. The touch sensitive image display device according to claim 1, wherein the light source of non-visible light is a first light source of non-visible light, and wherein said presence detection system further comprises a second light source of non-visible light.

3. The touch sensitive image display device according to claim 2, wherein said second light distribution is substantially two-dimensional.

4. The touch sensitive image display device according to claim 2, wherein said second light distribution is a three-dimensional volume.

5. The touch sensitive image display device according to claim 1, wherein said touch sensitive image display device comprises displaying a further image adjacent to or at least partially overlapping said displayed image.

6. The touch sensitive image display device according to claim 1, wherein said presence detection system is a separate module to said multi-pixel sensor system and further comprises a transceiver or transmitter to communicate with said multi-pixel sensor system.

7. The touch sensitive image display device according to claim 2, the device configured to repetitively pulse said second light distribution.

8. The touch sensitive image display device according to claim 7, wherein said presence detection system is configured to perform said object detection when said second light distribution is pulsed on.

9. The touch sensitive image display device according to claim 7, wherein said touch sensitive image display device comprises a controller configured to read in said detected object signal synchronous with said pulsing.

10. The touch sensitive image display device according to claim 2, wherein said sensor system is configured to detect a background light intensity level when said second light distribution is off.

11. The touch sensitive image display device according to claim 10, wherein said touch sensitive image display device comprises a controller to control said touch sensitive image display device responsive to said detected presence signal and said background light intensity level.

12. The touch sensitive image display device according to claim 1, further comprising a spatial light modulator (SLM) and a controller to control said SLM, on the basis of data defining said displayed image, to replay a target image distorted to compensate for projection onto said surface at said acute angle.

13. The touch sensitive image display device according to claim 2, wherein said second light distribution light source is a light emitting diode, laser, filament lamp or fluorescent lamp.

14. The touch sensitive image display device according to claim 1, wherein said second, presence sensor is a single pixel light sensor.

15. The touch sensitive image display device according to claim 2, wherein said second light source of non-visible light is pulsed and switched off after said hovering is detected.

16. The touch sensitive image display device according to claim 1, wherein said presence detection system is used for detecting multiple said objects when one object is hidden behind another.

17. The touch sensitive image display device according to claim 1, wherein the touch sensitive image display device is implemented as part of a consumer electronic device.

18. The touch sensitive image display device according to claim 17, wherein the touch sensitive image display device is selected from a group consisting of: a camcorder, a camera, a music player, a mobile phone, a media player, and a computer.

* * * * *